(12) United States Patent
Loehden et al.

(10) Patent No.: US 8,025,758 B2
(45) Date of Patent: Sep. 27, 2011

(54) HEAT-SEALING COMPOUND FOR SEALING ALUMINIUM FOIL AND POLYETHYLENE TEREPHTHALATE FILM TO POLYPROPYLENE, POLYVINYL CHLORIDE AND POLYSTYRENE CONTAINERS

(75) Inventors: Gerd Loehden, Hanau (DE); Sven Balk, Hanau (DE); Manfred Braum, Mainz (DE); Juergen Hartmann, Griesheim (DE); Marita Kaufmann, Griesheim (DE); Michael Wicke, Seeheim-Jugenheim (DE)

(73) Assignee: Evonik Rohm GmbH, Darmstadt (DE)

( * ) Notice: Subject to any disclaimer, the term of this patent is extended or adjusted under 35 U.S.C. 154(b) by 927 days.

(21) Appl. No.: 11/817,846

(22) PCT Filed: Jun. 6, 2006

(86) PCT No.: PCT/EP2006/062933
§ 371 (c)(1),
(2), (4) Date: Sep. 5, 2007

(87) PCT Pub. No.: WO2006/134042
PCT Pub. Date: Dec. 21, 2006

(65) Prior Publication Data
US 2008/0057205 A1    Mar. 6, 2008

(30) Foreign Application Priority Data

Jun. 17, 2005    (DE) .......... 10 2005 028 432
Sep. 6, 2005    (DE) .......... 10 2005 042 389

(51) Int. Cl.
*C04B 37/00*    (2006.01)
*B05D 3/02*    (2006.01)
*C08L 33/06*    (2006.01)

(52) U.S. Cl. .......... 156/325; 427/387; 525/228
(58) Field of Classification Search .......... 156/325; 427/387; 525/228
See application file for complete search history.

(56) References Cited

U.S. PATENT DOCUMENTS

| | | | |
|---|---|---|---|
| 4,946,743 A * | 8/1990 | Winter .......... | 428/349 |
| 5,458,965 A * | 10/1995 | Yoshinaka et al. .......... | 428/323 |
| 5,794,403 A | 8/1998 | Oberlander et al. | |
| 6,498,209 B1 | 12/2002 | Loehden et al. | |
| 6,566,441 B1 | 5/2003 | Lohden et al. | |
| 6,809,163 B2 | 10/2004 | Schultes et al. | |
| 6,989,409 B2 | 1/2006 | Loehden et al. | |
| 7,049,355 B2 | 5/2006 | Quis et al. | |
| 2003/0068453 A1 | 4/2003 | Kong | |
| 2004/0116567 A1 | 6/2004 | Schmitt et al. | |
| 2007/0068088 A1 | 3/2007 | Einfeldt et al. | |
| 2007/0117948 A1 | 5/2007 | Loehden et al. | |
| 2007/0193156 A1 | 8/2007 | Kautz et al. | |
| 2007/0193159 A1 | 8/2007 | Schattka et al. | |
| 2007/0193478 A1 | 8/2007 | Schattka et al. | |
| 2007/0196655 A1 | 8/2007 | Schattka et al. | |
| 2007/0197671 A1 | 8/2007 | Schattka et al. | |
| 2007/0197689 A1 | 8/2007 | Kautz et al. | |
| 2007/0197690 A1 | 8/2007 | Schattka et al. | |
| 2007/0197691 A1 | 8/2007 | Kautz et al. | |
| 2007/0204543 A1 | 9/2007 | Schattka et al. | |
| 2007/0204544 A1 | 9/2007 | Kautz et al. | |
| 2007/0208107 A1 | 9/2007 | Schattka et al. | |
| 2007/0208109 A1 | 9/2007 | Kautz et al. | |
| 2007/0259987 A1 | 11/2007 | Schattka et al. | |
| 2009/0048401 A1 | 2/2009 | Loehden et al. | |
| 2009/0062508 A1 | 3/2009 | Balk et al. | |

FOREIGN PATENT DOCUMENTS

| | | |
|---|---|---|
| CN | 1430657 A | 7/2003 |
| EP | 0 291 065 | 11/1988 |
| WO | WO 01/90265 A1 | 11/2001 |

OTHER PUBLICATIONS

U.S. Appl. No. 12/673,348, filed Feb. 12, 2010, Brenner, et al.
U.S. Appl. No. 11/571,115, filed Dec. 21, 2006, Schattka, et al.
U.S. Appl. No. 11/997,621, filed Feb. 1, 2008, Loehden, et al.
U.S. Appl. No. 12/064,245, filed Feb. 20, 2008, Schattka, et al.
U.S. Appl. No. 60/975,574, filed Sep. 27, 2007, Kuppert, et al.
U.S. Appl. No. 12/441,664, filed Mar. 17, 2009, Schattka, et al.
U.S. Appl. No. 12/290,880, filed Nov. 4, 2008, Einfeldt, et al.
U.S. Appl. No. 12/301,903, filed Nov. 21, 2008, Balk, et al.
U.S. Appl. No. 12/373,732, filed Jan. 14, 2009, Balk, et al.
U.S. Appl. No. 12/304,275, filed Dec. 11, 2008, Balk, et al.
U.S. Appl. No. 12/373,892, filed Jan. 15, 2009, Balk, et al.
U.S. Appl. No. 12/373,531, filed Jan. 13, 2009, Schattka, et al.
U.S. Appl. No. 12/440,244, filed Mar. 6, 2009, Balk, et al.
U.S. Appl. No. 12/279,197, filed Oct. 21, 2008, Roos, et al.
U.S. Appl. No. 12/159,221, filed Jun. 26, 2008, Loehden, et al.
U.S. Appl. No. 12/992,184, filed Nov. 11, 2010, Koschabek, et al.

* cited by examiner

*Primary Examiner* — Philip Tucker
*Assistant Examiner* — Michael Orlando
(74) *Attorney, Agent, or Firm* — Oblon, Spivak, McClelland, Maier & Neustadt, L.L.P.

(57) ABSTRACT

The invention relates to a heat-sealing system consisting of an olefin polymer or olefin copolymer A, a methacrylate copolymer B, a graft polymer AB that is composed of the aforementioned components, a polyester C and an optional polymer D or an optional polymer blend $D_A$, in addition to a solvent or solvent mixture L. The heat-sealing system is characterised by a high heat resistance, excellent barrier properties and short sealing times in relation to various plastics and aluminium foil or PET film.

15 Claims, No Drawings

HEAT-SEALING COMPOUND FOR SEALING ALUMINIUM FOIL AND POLYETHYLENE TEREPHTHALATE FILM TO POLYPROPYLENE, POLYVINYL CHLORIDE AND POLYSTYRENE CONTAINERS

FIELD OF THE INVENTION

The tablets and foodstuffs packaging sector has for some time now seen the entry of polypropylene (PP) and polyethylene terephthalate (PET), as well as polystyrene (PS) and polyvinyl chloride (PVC). Unpretreated polypropylene is a very critical plastic for the coatings sector, since very often there arise problems with adhesive strength. Although these problems take on a somewhat different perspective when heat sealing to propylene is being carried out (PP in this case is not being coated but instead "bonded"), they are nevertheless still present. Hence the poly(meth)acrylate resins which have become established in the sealing of polystyrene or of PVC, such as DEGALAN® P 24 or DEGALAN® N 80, cannot be used, since with these products it is not possible to achieve sealed-seam strength.

DEGALAN® P24 is a copolymer of methyl methacrylate and butyl methacrylate and is marketed by Röhm GmbH & Co. KG. DEGALAN® N80 is a methyl acrylate-ethyl methacrylate copolymer and is likewise marketed by Röhm GmbH & Co. KG.

With DEGALAN® PM 555 (manufacturer: Röhm GmbH & Co. KG), a special, solvent-borne binder system based on polyolefin/poly(meth)acrylate in butyl acetate/methyl ethyl ketone, success has been achieved in developing a binder possessing outstanding suitability for the sealing of aluminium foils to polypropylene. However, with DEGALAN® PM 555, furthermore, it is also possible to implement equally effective sealing to polystyrene and PVC. To achieve aluminium adhesion, DEGALAN® PM 555 has to be primed with PVC copolymers such as VINYLITE® VMCH, for example, but in appropriate combination it can also be used as a one-coat system. VINYLITE® VMCH is an acid-containing PVC polymer (sales: Union Carbide).

DEGALAN® 4150-E (manufacturer: Röhm GmbH & Co. KG), finally, was developed in order to improve the known heat-seal composition for aluminium foils and plastic films so that instead of the hitherto customary solvent-borne binder system, comprising butyl acetate and methyl ethyl ketone, it is possible to use a solvent system which is not listed in the HAPs list (Hazardous Air Pollutants).

PRIOR ART

The place of receptacles and containers made of wood or of inorganic materials such as metal, glass and ceramics in foodstuffs packaging has at the present time been taken in many instances by plastic products. The requirements are in any case particularly exacting when the receptacles or containers are used to accommodate or preserve foodstuffs.

One decisive aspect in foodstuff preservation, whether it be dehydration, freezing or sterilization, is the complete prevention of microbial growth. In many cases this means that the containers must be given a gastight seal. Moreover, in the case of plastic containers, account must be taken of mechanical stability, control of water content, and the effects of atmosphere and light. (Cf. Ullmann's Encyclopedia of Industrial Chemistry 25th Ed. Vol. A11, 523-560; 583-618 VCH 1988; this reference also deals with the applicable standards.)

In foodstuffs technology, particularly in the case of dairy products such as yoghurt cups, closure of plastic receptacles is widely achieved by using aluminium lids coated with a sealing lacquer.

Aluminium lids of this kind constitute in many cases a three-layer laminate whose outer layer is frequently composed of (biaxially oriented) polyethylene terephthalate (O-PET), biaxially oriented polypropylene (OPP) or polyamide (O-PA), or of cellulose. The heat-sealable inner layer, in contrast, is commonly composed of polyethylene, ethylene copolymers, or polypropylene (U.S. Pat. No. 4,753,708; G. Stehle, Neue verpackung 9/91, pp. 94-101). Against the use of aluminium for the application, for example, of foodstuffs packaging, however, economic and environmental grounds are more and more entering the debate, particularly the high level of energy involved in producing the aluminium. Consequently aluminium is also being replaced by the use of plastic films provided with a sealable lacquer. The sealing lacquer is adapted to the plastic used. As a relatively inexpensive material for sealable films, with good mechanical strength and good barrier properties, a quite considerable part is played by unplasticized PVC, the sealing lacquer layer employed commonly being an acrylic resin, whose adhesive strength and melting point can be advantageously modified by means of additives. A growing importance is being accorded to PET films. PET films are normally sealed using polyvinyl acetate or polyethylene/-polyvinyl acetate, or polyester lacquers. These systems, however, have been developed specifically for the sealing of PET base materials and are of only limited suitability for sealing aluminium foils or aluminium coatings on composite films. To date there has been no disclosure of a heat-seal binder which when formulated appropriately is suitable for sealing both aluminium foils and PET films or films/foil coatings.

DE-A 35 31 036 describes plastic films which can be produced by coextrusion and are composed of a sealable layer of high-impact polystyrene, a block copolymer and a lubricant.

EP-A 0 406 681, however, rightly points out the problems associated with the use of heat-sealable plastic films rather than aluminium foil. A noticeable- and restrictive-manifestation as a general rule is the substantially reduced processing latitude. The processing range which results is predominantly very narrow, 10-20 C, and must be observed with a fair degree of consistency in order to guarantee undisrupted production and flawless use of the sealed pack. In the case of filling installations which have a plurality of cavities for the purpose of filling cups simultaneously, this condition is not always met. The object which EP-A 0 406 681 set itself was to improve the polystyrene-based films preparable by the coextrusion process in accordance with DE-A 35 31 036 in such a way, among others, that the processing latitude and processing reliability are increased. Furthermore, the intention was to ensure flawless production even on filling installations featuring a plurality of filling cavities. In practice this comes down to the use of relatively high sealing temperatures, with corresponding requirements imposed on the quality of the plastic films. According to EP-A 0 406 681 these requirements were met by a sealable plastic film produced by the coextrusion process or by lamination and comprising two layers, A and C, and, optionally, a layer B, and also, optionally, one layer each of an adhesion promoter D for joining each pair of layers A, optionally B and C, composed of 1% to 50% of a layer of a heat-sealable, high-impact polystyrene A, up to 95% of a base layer B and 1 to 99% of a high-melting plastic layer C, the total of the thicknesses or of the weight of A and optionally B and C being 100 in each case.

DE 101 50 898 (Röhm) relates to a heat-sealing system comprising an olefin polymer or olefin copolymer A, a methacrylate copolymer B and a graft polymer AX comprising the above components, and also a solvent or solvent mixture. The heat-sealing system is notable for high thermal stability and short seal times.

WO 2005/037548 (Showa Denko Plastic Products Co., Ltd.) describes an easy-to-open closure for packaging.

The sealing film is composed of two plies:
a sealing layer and
a primer.

The sealing layer is composed of
A) a copolymer of ethylene and alkyl (meth)acrylates or vinyl ester and
B) a polyester resin.

The primer is composed of component A of the sealing layer and a polyolefin (C).

The disadvantages of the system lie in the need for priming and in the fact that in the primer the relatively high-value alkyl (meth)acrylates are used which are unable to contribute anything to the properties of the sealing layer.

Furthermore, the polyester resin (B) possesses a very high melting point, which of course complicates the production of the layers.

A further disadvantage is that the good properties of the coating are achieved by double application of the organic material.

Object

The object was to develop a heat-seal lacquer binder which, in a formulation with polyesters, is suitable for closing not only aluminium foils but also PET films and not only aluminium-coated but also PET-coated films to all of the cup materials used, such as polystyrene, polypropylene or polyvinyl chloride. In addition, the seal ought to possess seal and barrier properties, with respect to both foil/film materials, which are at least comparable with, if not better than, those of the established heat-seal systems (e.g. Degalan® PM 555) with respect to aluminium foils. Furthermore, in a formulation without added polyester, this binder ought to exhibit an at least equivalent sealing performance to aluminium foils as that of established systems.

A further object was to achieve high adhesive strength, even at relatively high temperatures, immediately after sealing (high thermal stability), since in this way short cycle times are achieved for the sealing of the film and for the foodstuffs packager.

Yet a further object is to improve the known heat-seal composition for aluminium foils and plastic films in such a way that in place of the hitherto customary solvent-borne binder system, comprising butyl acetate and methyl ethyl ketone, it is possible to use a solvent system which is not listed on the HAPs list. A further aim is to achieve sufficient strengths of the closure within the usual cycle times employed for the heat sealing of aluminium foils or plastic films. By readjusting the solvent system the intention, finally, is to achieve an additional improvement in seal properties with respect both to aluminium and—in appropriate formulation—to PET films.

The object, furthermore, was to develop a heat-seal composition which remains stable in/to the printing operation which follows the application of the heat-seal composition. Prior-art binders can lead to deposits on the transport rolls of the printing machine after short printing times, so that reliable transport of the film to be printed is no longer possible. The printing machine has to be halted, partly dismantled, and cleaned. The change-over and cleaning times required for this are in some cases out of proportion to the running time of the machines. The binders of the invention allow trouble-free printing over a long period.

Achievement

The object is achieved by means of a film-forming dispersion of at least three different polymer types, A, B, AB, C and D or $D_A$, polymer type A being an olefin copolymer or olefin polymer, polymer type B being a methacrylate polymer, and polymer type AB being a graft polymer of polymer type A and polymer type B, and polymer type C being a polyester, and optionally one or more further polymer types D or $D_A$, which are different from the polymer types A—C, and a solvent or solvent system L.

Polymer Type A

The olefin polymers and copolymers for use in accordance with the invention, corresponding to A, are known per se. They are primarily polymers synthesized from ethylene, propylene butylene and/or other α-olefins having 5-20 carbon atoms, of a kind which have already been recommended for use as heat-sealable compositions. The molecular weight is situated in general at 10 000 to 300 000, preferably between 50 000 and 150 000. Olefin copolymers of the type to be employed are described for example in German Laid-Open Specifications DE-A 16 44 941, DE-A 17 69 834, DE-A 1939 037, DE-A 19 63 039 and DE-A 20 59 981.

As an olefin polymer it is possible for example to use Buna® 6170 (manufacturer: Lanxess AG).

Particularly suitable for use are ethylene-propylene copolymers; likewise possible are terpolymers involving addition of the known ter components, such as ethylidene-norbornene (cf. Macromolecular Reviews, Vol. 10 1975), although account must also be taken of their tendency towards crosslinking in the course of the aging process. The distribution may be largely random, though it is also possible with advantage to employ sequenced polymers containing ethylene blocks. The ethylene-propylene monomer ratio here is variable within certain limits, which can be set at about 95% for ethylene and about 95% for propylene, as an upper limit.

The amounts in which polymer type A is used in the mixture of the invention are between 15% and 65% by weight, preferably between 20% and 60% by weight and, with very particular preference, between 25% and 55% by weight.

Polymer Type B is composed, as defined, of polyacrylate and/or polymethacrylate sequences. Taken per se, in the form of a corresponding homopolymer or copolymer, for example, these are soluble in the solvent system L. The polymer B is generally synthesized to an extent or more than 50% by weight, preferably 80% to 100% by weight, of monomers of the Formula I

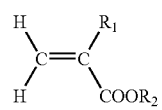

in which $R_1$ is hydrogen or methyl and $R_2$ is an alkyl radical, an aliphatic or aromatic radical having 1 to 30 carbon atoms, preferably 1 to 20 carbon atoms.

In the polymer B the following may additionally be present:

Monomers of the Formula II

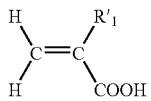

in which $R'_1$ is hydrogen or methyl, and/or polymerizable acid anhydrides, and/or monomers of the Formula III

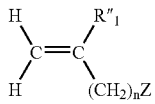

in which $R''_1$ is hydrogen or methyl and Z is an optionally alkyl-substituted phenyl radical, a radical —$COR_3$, a radical

a radical —$OR_4$ or a chlorine atom, and in which $R_3$ and $R_4$ are each an optionally branched alkyl radical having 1 to 20 carbon atoms or a phenyl radical, and n is 0 or 1, and/or monomers of the Formula IV

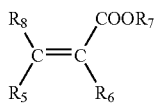

in which $R_5$ and $R_6$ are hydrogen or a radical —$COOR''_7$, $R_6$ being hydrogen or a radical —$CH_2COOR_{17}$, with the proviso that the compound of the Formula IV must contain two carboxyl-containing groups, and in which $R_7/R'_7$ and $R''_7$ are each hydrogen or an optionally branched alkyl radical having 1 to 20 carbon atoms, or phenyl. The polymer B may optionally further include fractions of the monomers of the Formula V

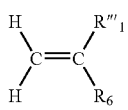

in which $R'''_1$ possesses the definition of $R_1$ and Bs is a nitrogen-containing functional radical such as a —CN group, a group —$CONR_9R_{10}$ in which $R_9$ and $R_{10}$ independently of one another are each hydrogen or a alkyl radical having 1 to 20 carbon atoms, or in which $R_9$ and $R_{10}$, with incorporation of the nitrogen, form a heterocyclic 5- or 6-membered ring, or in which Bs is an (inert) heterocyclic radical, in particular a pyridine, pyrrolidine, imidazole, carbazole or lactam radical or alkylated derivatives thereof, or Bs possesses the definition —$CH_2OH$, or in which Bs possesses the definition

—COO—Q—$R_{11}$ in which Q is an optionally alkyl-substituted alkylene radical having 2 to 8 carbon atoms and $R_{11}$ is —OH, is —$OR'''_7$ or is a radical —$NR'_9R'_{10}$, with $R'''_7$, $R'_9$ and $R'_{10}$ possessing the same definitions as $R_7$, $R_8$ and $R_9$: for example, together with the nitrogen atom, optionally with incorporation of a further heteroatom, forming a five- to six-membered heterocyclic ring.

Examples of the monomers of the Formula I include methyl methacrylate, ethyl methacrylate, propyl methacrylate, butyl methacrylate and isobutyl methacrylate. The monomers of the Formula I are also referred to as standard (meth)acrylates.

Examples of the monomers of the Formula II include acrylic acid or methacrylic acid.

Examples of monomers of the Formulae III and IV include, in particular, styrene, α-methylstyrene, vinyl chloride, vinyl acetate, vinyl stearate, vinyl methyl ketone, vinyl isobutyl ether, allyl acetate, allyl chloride, allyl isobutyl ether, allyl methyl ketone, dibutyl maleate, dilauryl maleate and dibutyl itaconate. The fraction of the monomers of the Formula II-V as a proportion of the polymer B is in general between 0% and 50% by weight, preferably 0% to 20% by weight (relative to the monomers of the polymer B). The fraction of the monomers of the Formulae II and/or V as a proportion of the polymer B will generally not exceed 20% by weight, and in general is 0% to 10% by weight, preferably 0% to 5% by weight.

Specifically, the polymer B, in terms of fraction and composition, is advantageously chosen with regard to the desired technical function. The fraction of the polar monomers of the Formulae II and V will in general not exceed 20% by weight, and is preferably 0% to 10% by weight (relative to the monomers of the polymer B), more preferably 0% to 5% by weight. Monomers of the Formula V include C- and N-vinylpyridine and also vinylpyrrolidine, vinylpyrrolidone, vinylcarbazole, vinylimidazole and the alkyl derivatives thereof, especially the N-vinyl compounds, and also the hydroxyl and dialkylaminoalkyl esters of acrylic and/or of methacrylic acid, especially dimethylaminoethyl (meth)acrylate, dimethylaminopropyl (meth)acrylate and hydroxyethyl (meth)acrylate.

The amounts in which polymer type B is used in the mixture of the invention are between 15% and 65% by weight, preferably between 20% and 60% by weight and, with very particular preference, between 25% and 55% by weight.

In the heat-seal system there is additionally a polymer AB, which represents a polyolefin grafted by B.

Polymer Type AB
Preparation of Graft Polymers AB

The graft polymer AB is generally prepared by preparing a dispersion of component A, with the aid of an appropriate emulsifier, and grafting component B onto this component A under the reaction conditions suitable for the purpose. The emulsifier may possess a structure similar to that of the system AB. The processes for preparing suitable emulsifiers of type AB are known per se. For example, it is possible to proceed in accordance with the method of transfer grafting (cf. also Houben-Weyl, Methoden der Org. Chemie, Vol. 1411, p. 114, H. A. J. Battaerd, G. W. Tregear, Polymer Reviews, Vol. 16, Interscience (1967)).

This is done by preparing a 10%-50%, preferably 20%-30% strength by weight solution of an OCP in a suitable solvent, inert under polymerization conditions, which normally possesses a boiling point above the process temperature. Examples of suitable solvents include butyl acetate, aliphatic cycloaliphatic and aromatic hydrocarbons. These OCP solutions are admixed with the monomers of the Formula I and/or, where appropriate, the other monomers II-III in the proportions indicated, and polymerization is carried out with the addition of one or more, preferably peroxidic, free-radical initiators at temperatures of 60 degrees C.-50 degrees C. over a time, commonly, of 4-8 hours. The aim is for maximum conversion. Preference is given to using peresters such as tert-butyl peroctoate. The initiator concentration is guided by the number of grafting sites desired and by the desired molecular weight of the segment B. In general the initiator concentration is between 0.2% and 3% by weight, relative to the polymer.

Optionally it is possible to use regulators as well in order to set the desired molecular weight of the segments B. Examples of suitable regulators include sulphur regulators, especially mercapto-containing regulators, an example being dodecyl mercaptan. The regulator concentrations are generally 0.1% to 1.0% by weight, relative to the overall polymer. Another method of preparing the graft polymers AB is the hydroperoxidation of an OCP as the first step. The chain-sited hydroperoxide groups formed in this way are able in a subsequent stage to initiate the graft polymerization of the vinyl monomers. (Cf. H. A. J. Battaerd, G. W. Tregear, Polymer Reviews loc. cit.)

One process for preparing suitable block polymers consists, for example, in anionic polymerization. In this case one possible procedure, for example, is to polymerize isoprene and/or butadiene with a suitable anionic initiator (e.g. organometallic compound) and to react the "living" anionic chain ends with, for example, alkyl methacrylate and/or styrene. The polymers thus prepared are subsequently hydrogenated under conditions in which the functional groups present are not attacked. For details of the preparation reference may be made to the relevant literature, e.g. Houben-Weyl, Methoden der Org. Chemie, 14/1, p. fff.; Block Copolymers, 5 D. C. Allport, W. H. Janes, Appl. Sci. Publishers Ltd., London, 1973; Graft Copolymers, H. A. J. Battaerd, G. W. Tregear, Polymer Reviews Vol. 16 (1967); Block and Graft Polymers, W. J. Burlant, A. S. Hoffmann, Reinhold Publishers Corp., New York, 1960.

The amounts in which polymer type AB is used in the mixture of the invention are between 15% and 70% by weight, preferably between 20% and 65% by weight and, with very particular preference, between 25% and 55% by weight.

Polymer Type C

As polymer type C use is made in accordance with the invention of a copolyester which is marketed under the brand name DYNAPOL® by Degussa AG. In addition it is also possible to use low molecular mass polyester types, and also polyesters having linear or branched alkyl groups; the polyesters may also be substituted by hydroxyl-containing alkyl groups. As polymer type C it is preferred to use the type DYNAPOL® LS 415, which is a saturated, linear, highly elasticized copolyester of very high molecular mass.

The properties of polymer type C in the case of DYNAPOL® LS 415 are as follows:

| Parameter | Value | Unit | Measurement method |
|---|---|---|---|
| Viscosity number | 75-85 | cm³/g | DIN 53 728 |
| Acid number | <3 | mg/KOH/g | DIN EN ISO 2 114 |
| Hydroxyl number | 5 | mg/KOH/g | DIN 53 240 |
| Molar mass | 25 000 | g/mol | calculated |
| Glass transition temperature | 12 | ° C. | DSC |
| Softening temperature | 110 | ° C. | ISO 4 625 |
| Density at 25° C. | 1.14 | g/cm³ | ISO 1 183 |

The viscosity number was measured on a solution of 0.5 g of polyester and 100 g of a mixture of phenol/o-dichlorobenzene (50/50 w/w).

The properties of polymer type C in the case of DYNAPOL® H 826-05/A are as follows:

| Parameter | Value | Unit | Measurement method |
|---|---|---|---|
| Viscosity (23 degrees C) | 3.0-5.5 | Pa s | DIN EN ISO 3 219 |
| Acid number (solvent-free) | <3 | mg/KOH/g | DIN EN ISO 2 114 |
| Hydroxyl number (solvent-free) | 18-24 | mg/KOH/g | DIN 53 240 |
| Molar mass | 6000 | g/mol | calculated |
| Glass transition temperature (solvent-free) | 30 | ° C. | DSC |
| Non-volatiles content | 55 ± 1 | % by weight | DIN EN ISO 3 251 |
| Density (20° C.) (solution as supplied) | 1.08 | g/cm³ | DIN 51 757 |
| Colour number (Gardner) | >3 | | DIN ISO 4 630 |
| Glass transition temperature (solvent-free) | 30 | ° C. | DSC |
| Flash point | 58 | ° C. | DIN 53 213 |

This is a saturated, linear, hydroxyl-containing polyester resin of medium molecular mass. It is marketed in a solvent mixture of 80% by weight naphtha 150 and 20% by weight naphtha 200, with a content of 55% by weight.

The properties of polymer type C in the case of DYNAPOL® L 208 are as follows:

| Parameter | Value | Unit | Measurement method |
|---|---|---|---|
| Viscosity number | 65-75 | cm³/g | DIN 53 728 |
| Acid number | 4-10 | mg/KOH/g | DIN EN ISO 2 114 |
| Hydroxyl number | 3-9 | mg/KOH/g | DIN 53 240 |
| Molar mass | 20 000 | g/mol | calculated |
| Glass transition temperature | 65 | ° C. | DSC |
| Softening temperature | 155 | ° C. | ISO 4 625 |
| Density at 20° C. | 1.25 | g/cm³ | ISO 1 183 |

The viscosity number was measured on a solution of 0.5 g of polyester and 100 g of a mixture of phenol/o-dichlorobenzene (50/50 w/w). This is a saturated, branched polyester of high molecular mass.

The properties of polymer type C in the case of DYNAPOL® H 820-20 are as follows:

| Parameter | Value | Unit | Measurement method |
|---|---|---|---|
| Viscosity (23 degrees C.) | 1.5-2.5 | Pa s | DIN EN ISO 3 219 |
| Acid number (solvent-free) | <3 | mg/KOH/g | DIN EN ISO 2 114 |
| Hydroxyl number (solvent-free) | 15-25 | mg/KOH/g | DIN 53 240 |
| Molar mass | 5000 | g/mol | calculated |
| Glass transition temperature (solvent-free) | 60 | ° C. | DSC |
| Non-volatiles content | 40 ± 1 | % by weight | DIN EN ISO 3 251 |
| Density (20° C.) (solution as supplied) | 1.07 | g/cm³ | ISO 1 183 |

-continued

| Parameter | Value | Unit | Measurement method |
|---|---|---|---|
| Colour number (Gardner) | >3 | | DIN ISO 4 630 |
| Flash point | 82 | °C. | DIN 53 213 |

This is a saturated, linear, hydroxyl-containing polyester resin of medium molecular mass. It is marketed in a solution in naphtha 200 (40% by weight).

The amounts in which polymer type C are used in the mixture of the invention are between 5% and 50% by weight, preferably between 5% and 30% by weight and, with very particular preference, between 10% and 25% by weight, the weight figures relating to the polymer without the possible solvent fraction.

Polymer Type D or $D_A$

To improve the aluminium adhesion a formulation with polymer type D is an option: priming the film or adding 0% to 10% by weight, better still 0% to 5% by weight, of polyvinyl chloride to the lacquer formulation allows an improvement to be observed in the Al adhesion. Use is made of, for example, VINYLITE® VMCH (marketed by Union Carbide).

Polymer type $D_A$ can be added optionally in order to reduce possible abrasion during processing. Use may be made of a polyamide of the VESTOSINT® 2159 (Degussa AG) type, for example. This can be added in a formulating fraction of between 0% and 10% by weight, better still between 0% and 5% by weight.

From preliminary experiments it is known that PET adhesion with a binder system as described above, comprising components A, B, AB and optionally D and/or $D_A$, in a solvent system comprising n-butyl acetate and ethyl methyl ketone (in analogy, for example, to Degalan® PM 555), in a formulation with the polymer component C, exists only with unsatisfactory sealing strengths, irrespective of the concentration of component C. Changing the solvent system over to an inventive composition described below, in contrast, leads to very good heat-seal properties in appropriate formulation with polymer component C.

Solvent or Solvent System L

In addition to the polymer types A and B, the graft polymer AB, the polymer type C and optionally the polymer type D or $D_A$, there is also a solvent system in the heat-seal system of the invention.

The solvents to be used for the solvent system L are to be selected such that they meet the requirements of coating technology for plastics and metals. The solvents to be employed—in a mixture if appropriate—are to be inert and, as a whole, unobjectionable, the boiling point as far as possible not exceeding 105 C at 760 torr.

A suitable solvent is a mixture of esters of aliphatic carboxylic acids with aliphatic alcohols and aliphatic hydrocarbons.

A suitable aliphatic carboxylic acid is acetic acid, propynoic acid or butyric acid.

Suitable aliphatic alcohols are ethanol, propanol, isopropanol, n-butanol, 2-butanol, 2-methyl-1-propanol or 2-methyl-2-propanol.

Suitable aliphatic hydrocarbons are pentane, hexane, heptane, octane, isooctane, nonane, decane, undecane or dodecane.

The aliphatic hydrocarbons may also be present in the form of their isomer mixtures and in mixtures with one another. Cycloalkanes, including substituted cycloalkanes, can be used as well.

When selecting L, attention should be paid to the compatibility between polymer components A and B. In the case of incompatibility between A and B, L may represent an equally good solvent for both components, in which case the dispersion forms as a result of the incompatibility.

In the case of compatibility between A and B, L must be chosen such that it represents a better solvent system for B than for A at a given temperature; the dispersion then forms on the basis of the different dissolution quality. In accordance with the invention the solvent L chosen is preferably a solvent such that the olefin copolymers can be swollen in the temperature range between 40° C. and 150° C. to 5% to 300% by weight ("degree of swelling").

The degree of swelling is defined as follows: an OCP film 1 mm thick, 2 cm long, 0.5 cm wide and of known weight is immersed in the solvent at a defined temperature—at 90° C. in the exemplified case—and stored isothermally for 24 hours, then removed from this solution using tweezers, freed from adhering swelling agent by means of a paper filter, and then immediately weighed. The measure defined for the swelling is the weight increase in percent, relative to the initial weight. The swelling measurement ought to be carried out at the temperature at which the concentrated OCP dispersion is to be produced. In accordance with the invention the swelling at this temperature ought to be 5% to 300% by weight. A precondition for the applicability of the criterion is that the maximum swelling of the OCP is attained under the conditions indicated above.

Mixtures of the above-described solvents are also suitable for the carrier system.

The fraction of the solvent or solvent system L as a proportion of the inventively concentrated polymer dispersions can be, for example, 80% by weight, in a particularly favourable case to down to 20% by weight, preferably below 70% by weight, in practice usually 55% to 40% by weight.

Production of the Heat-Seal System
Formulation with Polymer Types A-D
Alternative A:

Using an appropriate emulsifier, a dispersion or, in the case of a suitable match of polymer compatibility, a homogeneous solution of components A and C in the solvent system L is prepared, as elucidated above, and under appropriate reaction conditions component B is grafted onto component A. The proportions of A and B are generally in weight ratios of approximately 1:5 to approximately 5:1. The weight ratio of A to C is generally between approximately 1:2 and approximately 10:1, preferably between approximately 1:1 and approximately 5:1.

Alternative B:

Using an appropriate emulsifier, a dispersion or, in the case of a suitable match of polymer compatibility, a homogeneous solution of component A in the solvent system L is prepared, as elucidated above, and under appropriate reaction conditions component B is grafted onto component A. The proportions of A and B are generally in weight ratios of approximately 1:5 to approximately 5:1. The dispersion thus prepared is subsequently admixed with polymer component C. The weight ratio of A to C is generally between approximately 1:2 and approximately 10:1-better still between approximately 1:1 and approximately 5:1.

The amount of the overall polymer, based on the overall dispersion, independently of the preparation process, is at least 10% by weight, the aim in practice being for 40% to 80% by weight, normally 45% to 60% by weight.

The process of the invention produces heat-sealable coating compositions in dispersion, which possess sufficient stability for the processing operation. The stability of the dispersions amounts to at least several days, normally several weeks to months.

The heat-seal systems of the invention are notable for good adhesive strengths and for thermal stability. They can be used for sealing packaging, especially foodstuffs packaging.

EXAMPLES

Film/Foil Material Used

Soft aluminium foil with a thickness of 40 µm Polypropylene film, extruded from JE 6100 pellets (Shell), thickness 0.2 mm Polyester film: Hostaphan® WDW 50

Heat-Seal Solution Formula

Prior to processing, DEGALAN® PM 555 or 4150 E must be agitated thoroughly, since on prolonged storage there is a possibility of phase separation.

The heat-seal binders have a solids content in their as-supplied form (manufacturer: Röhm GmbH & Co. KG) of approximately 45% by weight and for further processing are diluted with methyl ethyl ketone (MEK) to approximately 30% by weight. For promoting adhesion on the aluminium foil, PVC copolymers have proved to be appropriate. They are either applied as a primer or used in combination with the heat-seal binders. In our investigations, combination took place with Vinylite®VMCH 95/5. For the coating of the polyester film, DEGALAN® was combined 90/10 and 80/20 with DYNAPOL®.

Laboratory Application of Heat-Seal Solution

The primer was applied as a 10% by weight solution of Vinylite® VMCH in ethyl acetate to the aluminium foil (10 cm×20 cm) using a No. 2 K-Handcoater. This corresponds to a dry film thickness of 0.5 µm-1.5 µm.

The DEGALAN® heat-seal solution was applied using the No. 4 K-Handcoater. Dry film thicknesses of 7 µm-9 µm were obtained.

Laboratory Drying of Coated Films/Foils

The primed films/foils were flashed off briefly (5-10 minutes) and then dried at 180° C. in a forced-air oven for 15 seconds.

Heat Sealing and Determination of Sealed-Seam Strength

The sealing operations were carried out using the heat sealer (HSG/ET) from Brugger.

Sealing conditions:

| Temperature: | 200° C. |
| --- | --- |
| Pressure: | 6 bar |
| Time: | 1 sec. |
| Seal area: | 10 × 10 mm |

The sealed-seam strength was determined by cutting samples into strips 15 mm wide and subjecting them to tension at a speed of 100 mm/min. using the tensile testing machine from Instron, model No. 1195, or Zwick, model No. 1454. Care was taken to ensure that, during the peel test, the parts of the foil/film already separated from one another formed an angle of 90° C. with the as yet unstressed remainder.

PP cups were sealed using a VL-1600 laboratory cup sealer from BHS.

Results of Experiments
Comparison of Solvent Systems
Heat-Seal Properties

| | | HSF (N/15 mm) | |
| --- | --- | --- | --- |
| Designation | Solvent L | Al/PP | PET/PP |
| Example 1 | Propyl acetate-isooctane-ethyl acetate | 12 | 7.8 |
| Example 2 | Propyl acetate-isooctane-ethyl acetate | | 7.0 |
| Comparative 1 | Butyl acetate-methyl ethyl ketone | approx. 10 | 1.1 |
| Comparative 2 | Butyl acetate-methyl ethyl ketone | | 3.2 |

| | | | |
| --- | --- | --- | --- |
| Composition of the polymer of Examples 1-2: | EPDM/PMMA/PMBA/polyester 42.9/18.55/18.55/20% by weight | Composition of solvent L: | Propyl acetate: 54% by weight iso-octane: 9.5% by weight Ethyl acetate: 36.5% by weight |
| Composition of the polymer of Comparative: 1-2: | EPDM/PMMA/PBMA/polyester 44/18/18/20% by weight | Composition of solvent L: | Butyl acetate: 70% by weight Methyl ethyl ketone: 30% by weight |

Both for Example 1 and for Comparative 1, the fraction of polymer is approximately 45% by weight and the fraction of solvent is approximately 55% by weight.

| EPDM = | Buna EP 6170 |
| --- | --- |
| PMMA = | polymethyl methacrylate |
| PBMA = | polybutyl methacrylate |
| Polyester = | Dynapol LH 826 |

The invention claimed is:

1. A heat-sealable coating system in the form of a film-forming dispersion and suitable for sealing different kinds of substrates, comprising:
   polymer types, A, B, AB, and C
   optionally the polymer types D or $D_A$, and
   an organic solvent system L,
   wherein
      polymer type A is an olefin polymer or olefin copolymer,
      polymer type B is a (meth)acrylate copolymer containing standard (meth)acrylates and in total up to 15% by weight of methacrylic acid and/or acrylic acid and/or another polymerizable acid, relative to polymer type B,
      polymer type AB is a graft polymer of polymer type A and polymer type B, and
      polymer type C is a polyester or a polyester mixture;
      optionally there is also an addition of polymer type D which is polyvinyl chloride or polymer type $D_A$ which is a polyamide, and
   the amount of polymer type A is between 15% and 65% by weight,
   the amount of polymer type B is between 15% and 65% by weight, the amount of polymer type AB is between 15% and 70% by weight, the amount of polymer type C is between 5% and 50% by weight, the amount of polymer type D is between 0% and 10% by weight, the amount of polymer type $D_A$ is between 0% and 10% by weight, based on the total mass of the polymer types A, B, AB, C, D, and $D_A$, and the mass ratio of the total of polymer types A, B, AB, C, D and $D_A$ to the mass of the solvent or solvent mixture L is between 5:1 and 1:5.

2. The heat-sealable coating system suitable for sealing different kinds of substrates, according to claim 1,
wherein
the amount of polymer type A is between 20% and 60% by weight, the amount of polymer type B is between 20% and 60% by weight, the amount of polymer type AB is between 20% and 65% by weight, the amount of polymer type C is between 5% and 30% by weight, the amount of polymer type D is between 0% and 5% by weight, and the amount of polymer type $D_A$ is between 0% and 5% by weight, based on the total mass of polymer types A, B, AB, C, D and $D_A$.

3. The heat-sealable coating system suitable for sealing different kinds of substrates, according to claim 1,
wherein
the amount of polymer type A is between 25% and 55% by weight, the amount of polymer type B is between 25% and 55% by weight, the amount of polymer type AB is between 25% and 55% by weight, the amount of polymer type C is between 10% and 25% by weight, the amount of polymer type D is between 0% and 5% by weight, and the amount of polymer type $D_A$ is between 0% and 5% by weight, based on the total mass of polymer types A, B, AB, C, D and $D_A$.

4. The heat-sealing system according to claim 1,
Wherein the solvent system is a solvent mixture comprising components L1.) esters of aliphatic carboxylic acids with aliphatic alcohols and L2.) aliphatic hydrocarbons, wherein the weight ratio of L1.) to L2.) being between 1 and 200 and the boiling point of the solvent system under standard conditions being not more than 105 degrees Celsius.

5. The heat-sealing system according to claim 4,
wherein
the solvent system comprises a mixture of aliphatic hydrocarbons having 5-12 carbon atoms in the chain, and the chain may also be branched.

6. The heat-sealing system according to claim 4,
wherein the solvent system comprises a mixture of esters of aliphatic carboxylic acids having 2-4 carbon atoms in the chain, with aliphatic alcohols having 2-4 carbon atoms in the chain, and the chains may also be branched.

7. The heat-sealing system according to claim 4,
wherein the solvent system comprises a mixture of aliphatic hydrocarbons having 5-12 carbon atoms in the chain, and the chain may also be branched, and of a mixture of esters of aliphatic carboxylic acids having 2-4 carbon atoms in the chain with aliphatic alcohols having 2-4 carbon atoms in the chain, and the chain may also be branched.

8. The heat-sealing system according to claim 4,
wherein
the volume ratio between esters and aliphatic hydrocarbons is between 1 and 200.

9. The heat-sealing system according to claim 4,
wherein
the boiling temperature of the solvent system is between 70 degrees Celsius and 105 degrees Celsius.

10. The heat-sealing system according to claim 4,
wherein
the boiling temperature of the solvent system is between 85 degrees Celsius and 100 degrees Celsius.

11. A method of sealing heat-sealable substrates, comprising
applying a coating system of claim 1 to the substrates and heat-sealing the substrates.

12. The method according to claim 11,
wherein
an aluminium foil or a polyester film is coated with the coating system and sealed to a plastic selected from the group consisting of the plastics polypropylene, polyethylene, polystyrene, polyester and polyvinyl chloride.

13. The method according to claim 10,
wherein
the solvent system comprises a mixture of propyl acetate (40% to 70% by volume), ethyl acetate (24% to 45% by volume) and isooctane (5% to 15% by volume).

14. A packaging system,
wherein
said packaging system is sealed with a heat-sealing system according to claim 1.

15. A food packaging system,
wherein
said food packaging system is sealed with a heat-sealing system according to claim 1.

* * * * *